3,825,451
METHOD FOR FABRICATING POLYCRYSTALLINE STRUCTURES FOR INTEGRATED CIRCUITS
John A. Schoeff, Mesa, Ariz., assignor to Motorola, Inc., Franklin Park, Ill.
Original application Aug. 10, 1970, Ser. No. 62,437, now abandoned. Divided and this application May 1, 1972, Ser. No. 249,404
Int. Cl. B44d *1/18;* H01l *7/36, 19/00*
U.S. Cl. 148—175 1 Claim

ABSTRACT OF THE DISCLOSURE

An improved integrated circuit structure is shown having an integral polycrystalline silicon member. The doping of such polycrystalline silicon member controls the usage of such member. When the poly silicon doping characteristics equal that of the layer of semiconductor material upon which it is deposited, it forms a good conductor and is usable as a contact. When the polycrystalline silicon doping characteristics are again the same as that of the layer of semiconductor material upon which it is deposited but opposite that of the structure to be isolated, it forms a good isolation member. Various processes are shown for advantageously fashioning polycrystalline silicon structures.

BACKGROUND OF THE INVENTION

This is a division of application, Ser. No. 62,437, filed Aug. 10, 1970, now abandoned.

One of the major problems in the fabrication of integrated circuit transistors is the difficulty in contacting the collector region. Discrete devices may be mounted on a header, so that the collector region under the base is in direct contact with the collector lead. In integrated circuits, the collector current must follow a relatively long path through higher resistivity semiconductor material. The buried layer diffusion has eliminated a large portion of this collector series resistance, but resistive paths still exist vertically from the base to buried layer and from the buried layer to the collector metal contact on the surface. The former component is inherent in all transistor fabrication, and although it can be reduced somewhat by thinning and reducing the resistivity of the epitaxial layer, it cannot be eliminated.

The path from the collector leads to the buried layer can be made of negligible resistance in a number of ways, depending upon the integrated circuit fabrication technique. In dielectrically isolated circuits, methods of bringing the buried layer to the surface by diffusing it around the entire island have been successful. With diffusion isolated circuits, the deep N+ collector contact diffusion has been used.

The deep N+ collector contact diffusion reaches deeply into the epitaxial layer to the buried layer, providing a low resistance path for collector current. The drive-in of this diffusion is normally accomplished during the isolation diffusion cycle. Thus, the N+ lateral diffusion is equivalent to that seen in the isolation channels and a much larger area is required than for a conventional shallow collector contact. Techniques are described hereinafter for providing improved deep collector contacts.

In the manufacture of integrated circuits, it is recognized that effective electrical isolation is required between adjacent single crystal regions of different voltage levels. One widely used method of obtaining a degree of isolation is to perform a pattern of deep isolation diffusions in the single crystal surface layer of the substrate. The diffusion is performed with an impurity which results in the isolation regions having a conductivity type opposite to that of the epitaxial layer as grown for forming a series or patterns of large area PN junctions. Improvements on this method of isolation are described by John A. Schoeff in his copending U.S. Patent Application Ser. No. 44,277, filed June 8, 1970, now abandoned, entitled "Integrated Circuits Using Polycrystalline Isolation and Method of Making Same," assigned to the assignee of the present invention. Further improvements in polycrystalline isolation and the methods for achieving these improvements are described hereinafter in greater detail.

SUMMARY OF THE INVENTION

An object of the present invention is to provide an integrated circuit having improved characteristics.

A further object of this invention is to provide an integrated circuit configuration having a reduced collector saturation resistance arising from an improved deep collector contact configuration.

A still further object of this invention is the provision of a deep collector contact having a maximized perimeter geometry.

Another object of the present invention is to provide a deep collector contact of improved characteristics by providing a new means for promoting polycrystalline silicon growth.

A still further object of the present invention is to provide means for promoting polycrystalline silicon growth on a semiconductor employing a foundation pattern member.

Another object of this invention is to provide a foundation pattern member which is composed of a dielectric material, such as silicon dioxide ($SiO_2$) or silicon nitride.

A further object of the present invention is the provision of a foundation pattern member including a lower pattern member of silicon dioxide.

Another object of the present invention is the provision of a multilayer pattern member including a lower pattern member of silicon dioxide and a foundation pattern member of polycrystalline silicon.

A still further object of the present invention is the improvement of the electrical characteristics of polycrystalline silicon columns through selective doping.

An object of the present invention is the doping of a polycrystalline silicon column in a multilayered semiconductor by the use of a doped lower pattern member and/or through the exposure of the column at the surface of the semiconductor device during base diffusion.

An object of the present invention is the doping of a polycrystalline silicon column in a multilayered semiconductor by the use of a doped lower pattern member and/or through the exposure of the column at the surface of the semiconductor device during emitter diffusion.

These and other objects and features of this invention will become fully apparent in the following description of the accompanying drawings, wherein:

FIG. 9 shows the etching of the upper layer shown in FIG. 8;

FIG. 10 shows the etching of the next layer shown in FIG. 8;

FIG. 11 shows the final etching and cleaning of the structure shown in FIG. 8, thereby forming a multilayered pattern member having a lower pattern member and an upper foundation member which promotes poly silicon growth;

BRIEF DESCRIPTION OF THE INVENTION

Figure 1:
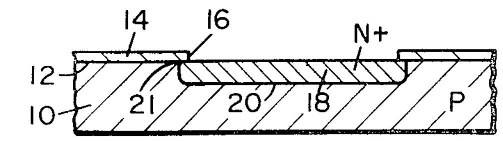
FIG. 1 shows a semiconductor body of one conductivity type having a buried layer of opposite conductivity type positioned therewith.

The prior art method of making poly deep collector contacts is to deposit and photoresist a pattern of thin poly silicon directly on the buried layer. The epitaxial layer is then grown and a column of poly silicon grows above this pattern leaving a poly column in direct contact with the buried layer. The doping necessary for low resistivity comes from both the upward diffusion of the buried layer and during the emitter diffusion at the epi surface. This method has several disadvantages. The major disadvantage is that the substrate surface where single crystal areas are to be grown can easily be damaged by the silicon etch used to remove the poly film. Another problem is that the thin polycrystalline film is in danger of being removed during HCl etching in the epitaxial reactor. Also, extra doping is sometimes necessary for the collector contact since the emitter diffusion may not completely saturate the poly, especially with high resisitivity material. Silicon tetrachloride has previously been used with (100) material, resulting in poor definition of the poly pattern, and a large space necessary for the contact due to spreading of the poly column.

An improved method of fabricating poly deep contacts of the present invention was therefore developed. A layer of dielectric material, such as silicon dioxide or silicon nitride, is formed on the wafer after buried layer processing. The material is then selectively etched to form the silicon oxide lower pattern member for the deep collector contact. A poly column is generated on the mask oxide, so that after epitaxial growth the oxide lies between the poly and buried layer. The process is successful due to the existence of an edge effect whereby the polycrystalline silicone grows out from the oxide edge for a short distance before being forced upward by the adjacent single crystal. The poly is thus contacting the buried layer. The donor impurities, from the buried layer which gather in the poly, enhance conduction by forming an ohmic contact around the edge of the oxide pattern. The standard emitter diffusion dopes the poly from the epi surface, so that the collector contact reaches a very low resistance. An additional advantage is that this deep collector contact structure withstands HCl etching in the epi furnace.

Polycrystalline deep collector contacts, with an undoped oxide pattern on the buried layer in the form of a standard collector contact, can provide a lower resistance than an N+ diffusion of larger area.

The oxide edge effect which enables buried layer contact can be used more extensively to enhance the low resistance path. By maximizing the oxide pattern perimeter with a discontinuous pattern, the edge contact is increased, and a greater proportion of the total collector contact area is made directly to the buried layer.

In some devices, especially those which use high resistivity epi, the poly column is not saturated with donor impurities by the emitter diffusion cycle and may not form a reliable ohmic conductive collector contact, since the donor electrons are trapped by dislocation sites in the polycrystalline silicon. A third automatic source of doping for the poly contact is easily added by using a doped oxide lower pattern for generating the poly column, which will be in addition to outdiffusion from the buried layer and epi surface diffusion during the normal emitter diffusion.

As with polycrystalline isolation, the use of a non-halogen source of epitaxial silicon such as silane gives much finer definition to the poly-single crystal interface. Also, the poly grows with almost vertical sides, yielding close to a one-to-one correspondence with the pattern member. The contact thus requires less space, and uses the mask dimensions of non-deep collector devices.

A still further improvement in the practice of the present invention is achieved through the use of a multilayered pattern member for the formation of the polycrystalline deep contact. A silicon oxide lower pattern member is in direct contact with the substrate material while a foundation pattern member of polycrystalline silicon is formed on the lower pattern member. The use of the lower pattern member permits protection of the areas on the substrate, where single crystal material must be grown, against the silicon etch.

As previously mentioned with the description of the deep collector contacts, a thin film of polycrystalline silicon deposited on the substrate at low temperatures has proven to be the most successful material for the nucleation of poly isolation channels. During the prior art procedure for forming poly isolation channels, it provides an almost exact model to which the polycrystalline isolation member patterns itself, and overcomes even the etching effect of silicon tetrachloride which usually makes poly nucleation difficult. The film of poly can be deposited by either vapor plating or sputtering. The temperature is reduced to below the point at which single crystal silicon can grow and a layer of less than one micron is deposited. The grain size is directly dependent upon temperature, with extremely fine grains being realized at the lower temperature ranges, forming an almost purely amorphous material. The grain size and surface quality of the poly channels thus generated are far superior to any oxide technique. In this prior art procedure, the etching of the thin poly pattern after photoresist developing proves to be the failing point of this substrate material as a foundation mask. A silicon etch composed of nitric, chromic, and acetic acids is used to etch away the thin poly film. When the film has been deposited directly upon the substrate, this solution is allowed to contact the single crystal substrate after etching through the film. Unless a dilute solution of etch is used and extreme care is exercised, damage will be inflicted upon the area where a faultless single crystal island must be grown since it is in this island that the transistor device to be isolated is formed. The process is unduly hazardous and the following is a replacement therefore.

In the present invention this failing point is removed by the addition of an oxide member as a lower pattern member. More specifically, before the poly is deposited, several thousand angstroms of low temperature pyrolytic oxide are deposited on the substrate. Then enough thin poly film is grown to complete the total desired thickness. Finally, an additional upper thin oxide layer is deposited on the poly which acts as a mask for etching the poly silicon film because the silicon etch tends to lift the exposed photoresist film and would attack the poly except for the upper oxide layer.

The pattern photoresist process uses three etch steps. After alignment, exposure and developing of the photoresist mask, the standard HF etch removes the upper oxide not protected by the exposed photoresist. Then silicon etch is used to remove the unprotected poly silicon layer. The poly pattern is protected from the silicon etch by both the developed photoresist and the upper oxide mask. If the photoresist lifts, the poly pattern still is etched perfectly since the upper oxide mask forms the protection during this step. A dilute solution of silicon etch may not lift the photoresist, making the upper oxide mask unnecessary. The upper oxide layer is deposited so effortlessly, by simply injecting oxygen with the silane, that the risk of lower yield by using another method is not justified. The wafer is then cleaned in chromic acid to remove the photoresist and then another standard HF etch removes the lower oxide and the upper oxide mask covering the poly pattern.

The poly pattern and the pattern of the lower oxide mask remains. The lower oxide covers the substrate in the area in which the active device such as a transistor is built. Since the standard HF etch does not attack the substrate, the substrate surface remains smooth and promotes good silicon growth. The upper oxide mask should be made thinner than the lower oxide layer so that the upper mask is removed automatically. The proper cleaning procedures are followed and the wafers are ready for epitaxial growth.

The multiple layer process has several important advantages. It offers epitaxial temperature flexibility, freedom in choice of substrate and epitaxial growth technique, and smooth, fine grain poly growth. A perfect device area on the substrate is maintained because the silicon etch never touches the substrate surface. Another very important advantage is that doping can be introduced in the oxide under the channels, which was a more difficult achievement with only a poly film.

DETAILED DESCRIPTION OF THE DRAWINGS

Buried Layer Contacts

Referring to FIG. 1, there is shown a body 10 of semiconductor material of one conductivity type such as P-type having at least an upper surface 12 upon which a masking layer 14 is formed having an opening 16 made therein according to standard photoresist techniques. Since the block 10 of semiconductor material is shown as being P-conductivity type, a material such as arsenic, is diffused through the opening 16 under standard procedures for forming the N+ diffusion area 18 characterized by a PN junction 20 having an edge 21 intersecting the surface 12.

Figure 2:
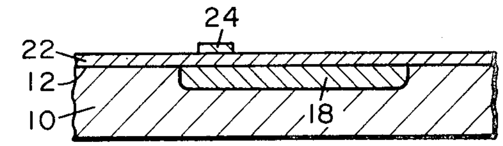
FIG. 2 shows the insulating layer, from which the lower pattern member is formed, on the composite structure shown in FIG. 1 and the placement of a photoresist mask.
Figure 3:
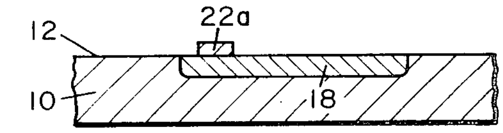
FIG. 3 shows the placement of the lower pattern member.
Figures 4, 5:
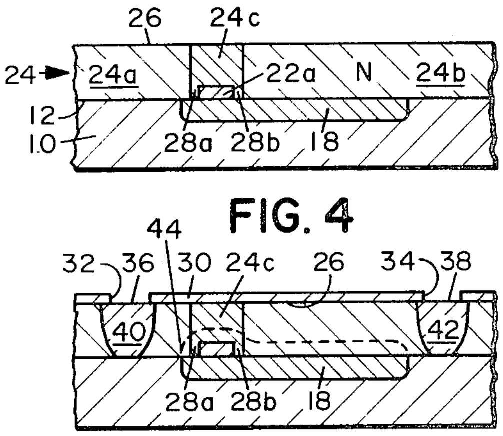
FIG. 4 shows the fashioning of an epitaxial layer wherein said layer includes portions of monocrystalline growth and polycrystalline growth.
FIG. 5 shows the addition of isolation members to the composite structure shown in FIG. 4 and the establishment of improved polycrystalline edge contact with the buried layer.
Figure 6:
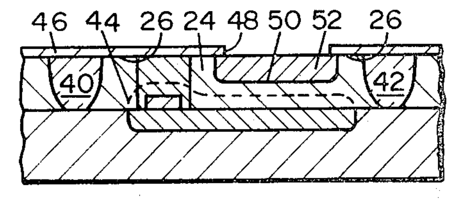
FIG. 6 shows the base diffusion within the area defined by the isolation member while the surface area of the poly column is protected.
Figure 7:
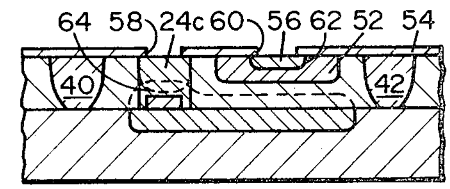
FIG. 7 shows the emitter diffusion within the base diffusion area while the surface area of the poly column is exposed.

Depending upon matters of choice, the layer 14 utilized as a masking layer, as well as each additional masking layer hereinafter mentioned, is stripped away and a fresh uncontaminated insulating layer 22 as shown in FIG. 2, is formed over the upper surface 12 of the semiconductor body 10. Through standard photoresist techniques a mask 24 is formed in the pattern of the desired deep collector contact in superimposed spatial relationship to the region 18 or layer to be contacted. It is not intended to be a limitation of the present invention that a buried layer 18 is shown as opposed to a separate layer. In operation the present invention is usable for contacting subsurface layers as well or a subsurface region such as the N+ region 18. The preferred embodiment employs silicon dioxide or silicon nitride as the insulating layer 22. After a standard etch process the composite structure is shown in FIG. 3 as the body of semiconductor material 10 having a region 18 associated therewith and a pattern of dielectric material **22*a* spatially oriented for contacting the buried layer 18 or separate layer. More specifically, the material 22*a* forms a pattern upon which polycrystalline silicon grows and its placement is dictated by design consideration. FIG. 4 shows the formation of an N conductivity type epitaxial layer 24 on the upper surface 12 of the body 10 including the buried layer 18 and the pattern member 22*a*. The layer 24 has significant features including being formed from a single source of high purity silane or silicon tetrachloride gas and being deposited upon the surface 12 as monocrystalline silicon in regions 24*a* and 24*b* and polycrystalline silicon in region 24*c*. For purposes of clarity the "edge effect" growth of polycrystalline silicon is emphasized in FIG. 4 by drawing the results of such effect out of scale. The polycrystalline silicon does grow around the pattern 22*a* and contact the layer 18 directly. This outgrowth from the oxide pattern 22*a* is the means for achieving high conductive paths from an upper surface 26 of the epitaxial layer 24 to the buried layer 18. Since the edge effect is the means for achieving a highly conductive path, the edge effect is enhanced by employing columns, such as 24*c*, of polycrystalline silicon having a maximized perimeter. Rather than a single circular column or bar, a contact member such as 24*c* may be designed in any shape. One such shape that has proved highly useful takes the shape of long narrow strips placed parallel and closely together. Such a design takes the same overall area on an integrated chip of a standard collector contact, but maximizes the edge effect contact with the buried layer 18 since the edge effect is associated with each pattern edge contacting the layer 18 at each point around the stripe such as at 28*a* and 28*b*. The upper surface 26 is used thereafter for the formation of a transistor as shown in FIGS. 5 through 7. However, it should be kept in mind that the type of semiconductor device formed upon such surface 26** is not intended to be a limitation upon the present invention.

Referring to FIG. 5, there is shown the structure illustrated with reference to FIG. 4 having a mask layer 30 formed over the upper surface 26 with a plurality of openings 32 and 34 provided therein through which deep isolation diffusion steps are performed according to the techniques well known in the prior art. A P type accepter impurity such as boron is deposited upon exposed areas 36 and 38 of the upper surface 26 and the deep isolation diffusion takes place under a relatively high temperature of 1200° C. for 3 hours.

During this last mentioned diffusion the impurities contained within the N+ buried layer 18 out-diffuse into the N epitaxial layer 24 forming an N+ junction represented by a dotted line 44. The donor impurities from the buried layer 18 gather in the poly region **24*c* and form an ohmic contact around the edge of the oxide pattern at 28*a* and 28*b*. It should be noted that the dotted line bends upward towards the surface within the polycrystalline silicon contact area 24*c*** since diffusion takes place faster in polycrystalline silicon.

Referring to FIG. 6, the layer 30 is stripped away and a new masking layer 46 is formed over the upper surface 26 of the composite semiconductor body, which layer includes an opening 48 through which a standard base diffusion takes place forming a PN junction 50 between the one conductivity type area 24 and an opposite conductivity type area 52 forming the base region.

Referring to FIG. 7, the layer 46 is removed and a new layer 54 is formed over the composite semiconductor body including the isolation diffusion areas 40 and 42, which layer 54 includes openings exposing the upper surface of the poly silicon contact area 24c and a portion of the base 52 into which an emitter region 56 is formed through opening 60. A diffusion of phosphorus into the base region 52 forms an N type region 56 separated from the base region 56 by a PN junction 62. The poly silicon column 24c is exposed to this diffusion step and phosphorus is diffused through the opening 58 into the contact 24c to a greater depth than the diffusion of phosphorus into the emitter region. The diffusion rate is sufficiently high that the downward diffusion denoted by a boundary line 64 during the emitter formation interacts with the out-diffusion from the N+ buried layer making the entire contact 24c highly conductive.

Triple Sandwich Method of Polycrystalline Column Growth

Figure 8:
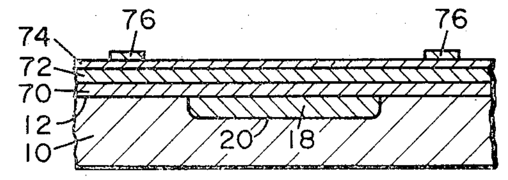
FIGS. 8 through 11 show the steps of a triple etch procedure suited for use in the present invention.
Figure 10:
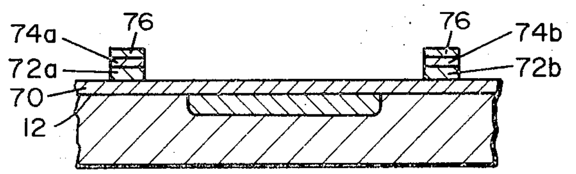

A semiconductor body 10 is shown in FIG. 8 having a buried layer 18 formed therewithin by standard techniques. A first layer 70 of low temperature pyrolytic oxide, from 450° C. is formed in the temperature range from 450° C. to 600° C., on the upper surface 12 of the body 10. This oxide layer 70 is formed 1,000 to 10,000 angstroms thick, preferably between 2,000 and 5,000 angstroms thick. Then a second layer 72 of polycrystalline silicon between 1,000 and 10,000 angstroms thick is formed on the first layer. This second layer 72 is preferably 2,000 angstroms thick and is also formed at low temperature between 600° C. and 900° C. A third layer 74 of oxide is formed on the second layer 72 at relatively low temperature between 450 to 600° C. This layer 74 is thinner than the oxide layer 70 and in the preferred embodiment is 2,000 angstroms thick. This layer is thinner than the layer 70 since during the etch of the layer 70 the layer 74 remaining, as shown in FIG. 10 is removed also. A layer of photoresist is formed over the layer 74, exposed, developed and cleaned leaving a pattern 76 of the polycrystalline column to be formed. This pattern assumes any desired geometric shape.

Figure 9:
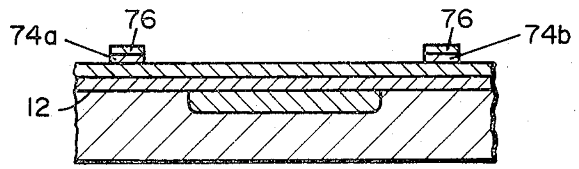

Referring to FIG. 9, the result of a standard HF etch is shown whereby the oxide layer 74 is removed except for portions 74a and 74b protected by the mark 76.

Figure 11:
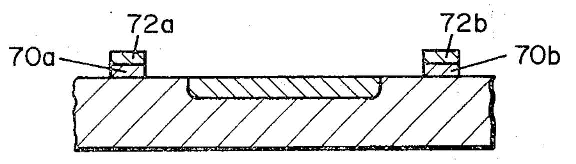

Referring to FIG. 10, a silicon etch removes the unmarked portion of the polycrystalline layer 72 leaving foundation portions 72a and 72b. During this etch the upper surface 12 is protected by the oxide 70. If the photoresist mask layer 76 lifts during the silicon etch the portions 72a and 74b are protected by the oxide portions 74a and 74b respectively. A dilute solution of the same silicon etch may not lift the photoresist, making the oxide masks 74a and 74b as unnecessary. However, the use of the silicon masks 74a and 74b form the preferred embodiment. The structure shown in FIG. 10 is cleaned in chromic acid to remove any portion of the photoresist mask 76 remaining. A standard HF etch removes the unprotected regions of the layer 70 as well as the thinnner portions 74a and 74b of the third layer 74 leaving a double mask as shown in FIG. 11 comprising an oxide lower member 70a and 70b contacting the surface 12 and an upper foundation member of polycrystalline silicon 72a and 72b respectively. The silicon oxide lower member 70a makes a good contact with the silicon body 10 at the upper surface 12 and the entire layer 70 protects such surface 12 during the poly silicon etch of the layer 72 while the future poly silicon growth or neucleation is optimized on the upper foundation member 72a.

The triple sandwich process has several important advantages. It offers epitaxial tempertaure flexibiltiy, freedom in choice of substrate and epitaxial growth techniques, and smooth, fine grain poly growth. A perfect device island area on the substrate is maintained because the silicon etch never touches the substrate surface. Another very important advantage is that doping can be introduced in the oxide layer 70a under the poly column to be formed over the foundation layer 72a, which was a more difficult achievement with only a poly film.

The need for doping is described in greater detail hereinafter with reference to the description of the High Voltage Diffusion Techniques for Isolation.

An N epitaxial layer 78 is formed over the composite structure shown in FIG. 11 promoting regions 78a, 78b, and 78d of monocrystalline silicon growth and regions 78c and 78e of polycrystalline growth. The foundation patterns 72a and 72b are of like material so that they merge into the regions 78c and 78e respectively and are no longer readily distinguishable.

Figure 13:
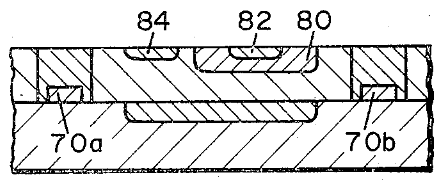
FIG. 13 shows a completed transistor utilizing a polycrystalling column for isolation.

A completed transistor circuit is shown in FIG. 13 constructed within the isolated device island 78b including a base region 80, an emitter region 82 and a collector enhancement region 84.

Polycrystalline Strip Method of Polycrystalline Column or Contact Growth

Figure 14:
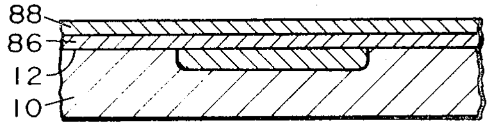
FIGS. 14 through 17 show a different method of forming a polycrystalling silicon member upon a silicon dioxide mask which is usable for isolation.
Figure 15:
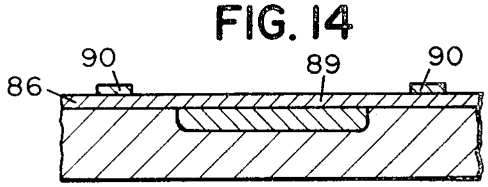
Figure 16:
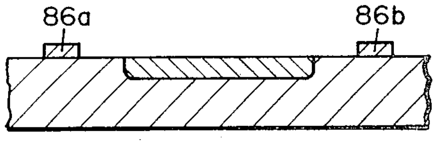
Figure 17:
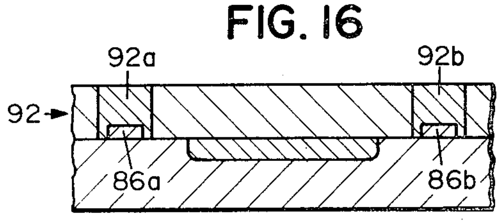

FIGS. 14 through 17 illustrate an alternate embodiment for promoting polycrystalline growth upon a silicon body 10. Referring to FIG. 14, a silicon semiconductor body 10 having an upper surface 12 is provided with a first layer 86 of silicon oxide. A second layer 88 of polycrystalline silicon is formed thereover at a higher temperature of approximately 900° C. At this temperature, the poly silicon and oxide interact so as to roughen the surface of the oxide in the pattern of the polycrystalline silicon. The layer 86 is removed by a standard silicon etch compound, stripping off the entire layer of poly silicon. This etch procedure exposes the roughened upper surface 89 of the oxide layer 86 shown in FIG. 15. A photoresist mask 90 is formed in the roughened surface 89 in the pattern of the required polycrystalline silicon growth. The remaining oxide layer 86 is removed through a standard HF etch leaving portions 86a and 86b which are protected by the mask 90. The mask 90 is removed through a standard cleaning cycle. Polycrystalline portions 92a and 92b of an epitaxial layer 92 are grown more uniformly on a roughened surface than upon an oxide pattern 86a and 86b having smooth upper surfaces.

Polycrystalline Sandwich for Collector Contact Growth

Figure 18:
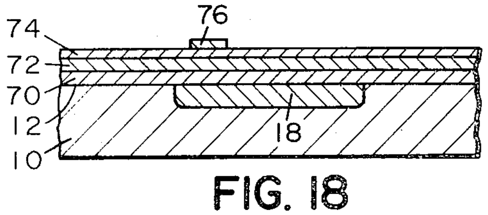
FIG. 18 shows a composite structure utilized for the formation of a multilayered pattern upon a substrate having a buried layer located therewithin.
Figure 19:
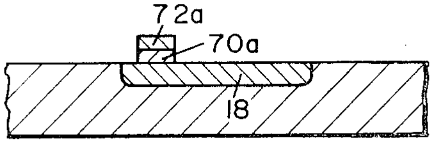
FIG. 19 shows the structure of FIG. 18 after the triple etch procedure shown in FIGS. 9 through 11 has been practice thereon.

Referring to FIG. 18, the triple etch procedure described with reference to FIGS. 8 through 12 is repeated for illustrating the application of that procedure when it is desired to utilize a multilayer pattern for promoting polycrystalline silicon growth upon the buried layer 18 of a semiconductor body 10. Briefly restating this procedure, the first layer 70 of low temperature silicon oxide is formed over the upper surface of the body 10, followed by a layer 72 of polycrystalline silicon, followed by a layer 74 of silicon oxide which is thinner than the layer 70. In this use of the procedure, the mask 76 is spatially oriented for fashioning a poly silicon contact for the layer 18. FIG. 19 shows the resulting configuration after the triple etch procedure has been followed including a lower pattern number 70a in contact with the layer 18 and an upper foundation member 72a positioned thereupon.

Figure 20:
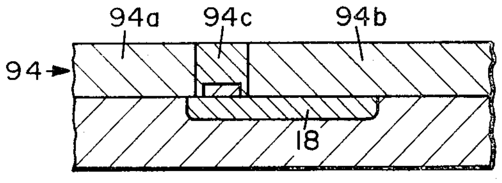
FIG. 20 shows the formation of an epitaxial layer with the contact made to the buried layer shown in FIG. 19.

FIG. 20 shows the formation of an epitaxial layer 94 upon the composite structure shown in FIG. 19 having monocrystalline portions 94a and 94b and polycrystalline portion 94c. The upper foundation member 92a blends into the portion 94c as to be indistinguishable therefrom. The lower pattern member may be doped with donor impurities so that the resulting out-diffusion will further lower the collector contact resistance.

Compatible Process for Combining Buried Layer Contacts and Polycrystalline Isolation Within a Single Semiconductor Body Polycrystalline deep collector contacts are usable with diusion isolated and polycrystalline isolated integrated circuits. Deep collector contacts and diffusion isolation has been illustrated hereinbefore with reference to FIG. 5 through FIG. 7. FIGS. 21 through 25 illustrate a compatible process for utilizing buried layer contacts and polycrystalline isolation. During this process, the conduction at the poly "edge effect" is minimized in the isolation part of the method, while at the same time a direct poly contact with the buried layer is used for the making of the collector contacts.

Figure 21:
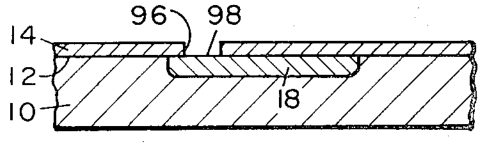
FIGS. 21 through 25 show the method through which polycrystalline growth is simultaneously achieved for deep collector contacts and for polycrystalline isolation.
Figure 22:
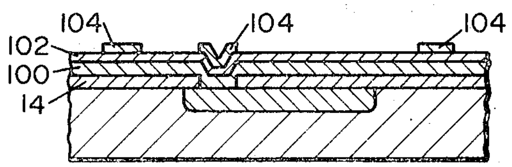

FIG. 21 shows a silicon semiconductor body 10 having an upper surface 12 upon which a P doped mask 14 is formed including an opening 96 positioned over a previously diffused buried layer 18 exposing an upper portion 98 of the layer 18. A polycrystalline silicon layer 100 is formed over the composite structure shown in FIG. 21 as shown in FIG. 22 and can be doped if desired. The layer 100 is formed integral with the upper surface 98 and the mask layer 14. A third oxide mask layer 102 is then formed followed by the formation of a photoresist mask 104 in the pattern of the isolation members to be hereinafter formed. The layer 102 is again thinner than the doped oxide layer 14.

Figure 23:
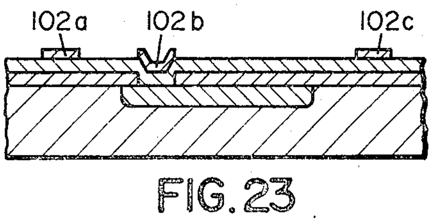
Figure 24:
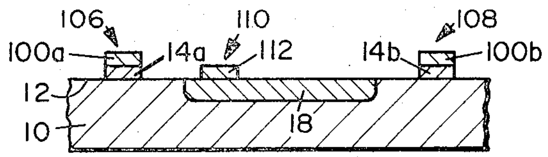

A standard triple etch sequence as described with reference to FIGS. 8 through 11 is performed with the first HF etch leaving intermediate structure shown in FIG. 23. A cleaning step removes the photoresist mask 104, leaving oxide patterns 102*a*, 102*b* and 102*c*. The remaining steps of the triple etch leave the structure as shown in FIG. 24 comprising a body 10 of semiconductor material having an integral buried layer 18 to which surface contact is ultimately desired. Multilayered patterns 106 and 108 are formed integral with the surface 12 of the body 10 and because of their respective purposes are dissimilar from the single layer pattern 110 formed integral with the buried layer 18. Doped portions 14*a* and 14*b* of the first oxide layer 14 adhere evenly to the upper surface 12 of the silicon body 10. Foundation portions 100*a* and 100*b* formed over lower members 14*a* and 14*b* respectively adhere evenly thereto and form the foundation of polycrystalline silicon members to be formed thereover.

A single polycrystalline silicon portion 112 comprises the buried layer contact lower member since the remaining surface 12 of the body 10 was protected by the layer 14 from the silicon etch used to remove the unneeded portion of the layer 100. Hence, the surface 12 shown exposed in FIG. 24 is clean and unmarred and suitable for even epitaxial growth. It is within the scope of the present invention to utilize a multilayered pattern in both the isolation pattern 106 and 108, and the collector contact 110 simultaneously. To acomplish this, the above process can be altered by merely deleting the single step of forming the opening 96 in the first doped layer 14 as shown in FIG. 21.

The doped oxide portions 14*a* and 14*b* are used in the preferred embodiment of the present invention and are exchangeable for undoped oxide for lower voltage application and remain within the scope of the present invention.

Figure 25:
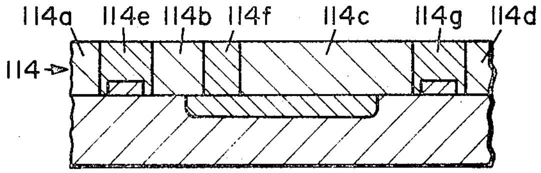

Referring to FIG. 25, an N epitaxial layer 114 is formed over the composite structure shown in FIG. 24 comprising monocrystalline regions 114*a*, 114*b*, 114*c* and 114*d*, and polycrystalline regions 114*e*, 114*f* and 114*g*.

Figure 12:
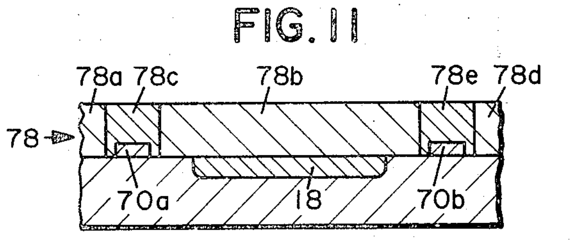
FIG. 12 shows the formation of an epitaxial layer of silicon having a monocrystalline region and a polycrystalline region.

The process descriped hereinbefore with reference to FIG. 7 is followed with reference to region 114*f* when it is elected to complete the highly conductive nature of this contact member. The process described hereinbefore with reference to FIGS. 12 and 13 is followed with reference to regions 114*e* and 114*g* when it is elected to complete the isolation techniques taught herein.

High Voltage Diffusion Process

Figure 26:
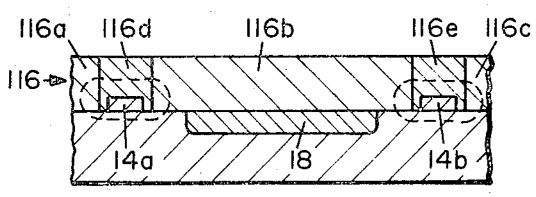
FIGS. 26 and 27 show the formation of a polycrystal--line silicon annular member having a high voltage rating due to the diffusion technique shown therein.
Figure 27:
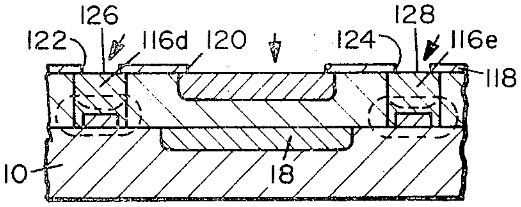

A preferred embodiment of such treatments of regions 114*e* and 114*g* is shown with reference to FIGS. 26 and 27 when the buried layer 18 was suitably doped with arsenic and the oxide regions, such as 14*a* and 14*b*, shown in FIG. 24 are lightly doped with boron to a level which is sufficient to invert the conductivity type of the surrounding regions when out-diffusion of the boron occurs. An epitaxial layer 116 is then formed as shown in FIG. 26, having lower mask portions 14*a* and 14*b* which are lightly doped and integrally formed with, but indistinguishable from, upper foundation member 100*a* and 100*b*.

The epitaxial layer 116 comprises monocrystalline regions 116*a*, 116*b* and 116*c* and polycrystalline regions 116*d* and 116*e*.

The high voltage diffusion process is continued with reference to FIG. 27, where a diffusion mask 118 is formed over the composite structure shown in FIG. 26 having a base diffusion opening 120 formed therein and poly isolation openings 122 and 124 formed therein exposing the upper surfaces 126 and 128 of the regions 116*d* and 116*e* respectively. A base diffusion step calculated to establish an opposite conductivity type of resistivity in the range of 50 to 300 ohms/square is performed as indicated by the arrows, which is defined as a light doping. The diffusion will proceed much more deeply into the polycrystalline material, overlapping the diffusion from the lower oxide and changing the poly to a high resistivity P type material. This combination of light oxide doping of the lower pattern member and light doping of the poly region has given heretobefore unattainable isolation voltages of 150 to 200 volts on 1 ohm-cm. epitaxial layers; higher than that which can be attained with diffusion isolation.

Throughout the description of the present invention references are made to a standard silicon etch. Such an etch is well known in the art and comprises compositions including acetic, nitric and hydrofluoric acids.

Reference is made specifically to silicon semiconductor material in describing the present invention but this is not to exclude germanium semiconductor material. Since germanium semiconductor material has the same lattice structure as silicon semiconductor material, germanium can be used as an equivalent of silicon. For the purpose of the specification and claims, silicon and germanium are both included in the term semiconductor material.

In the high voltage diffusion process the polycrystalline isolation member receives the same diffusion as given the base and can conveniently be given at the same time as the base. In the preferred embodiment, impurities are introduced into the base such as to give an impurity content of between $10^{15}$ and $10^{20}$ acceptor atoms per cubic centimeter with $10^{17}$ acceptor atoms per cubic centimeter the preferred density.

While the invention has been particularly shown and described with reference to preferred embodiments thereof, it will be understood by those skilled in the art that the foregoing and other changes in form and details may be made therein without departing from the spirit and scope of the invention.

I claim:

1. The method of making a semiconductor device including a region of single crystal semiconductor material of one conductivity type having a first surface, comprising the steps of:
   - depositing a first layer of dielectric material over said first surface;
   - depositing a layer of polycrystalline semiconductor material over said layer of dielectric material;
   - depositing a second layer of dielectric material over said layer of polycrystalline material;
   - developing and forming a photoresist mask on said second layer in the pattern desired;
   - etching away the unmasked portion of said second layer of dielectric material and leaving a pattern member of dielectric material as a mask on said polycrystalline layer;
   - etching away the unmasked portion of said polycrystalline layer and leaving a pattern member of said polycrystalline layer as a mask on said first layer;

removing said pattern member of said photoresist mask and said second layer of dielectric material and said unmasked portion of said first layer and leaving a multilayered pattern member;

epitaxially depositing simultaneously a polycrystalline semiconductor material column overlying said pattern member in direct electrical contact with said first surface and a layer of monocrystalline semiconductor material overlying said first surface; and doping said first dielectric layer during its formation with a dopant of said one conductivity type.

References Cited

UNITED STATES PATENTS

| | | | |
|---|---|---|---|
| 3,617,822 | 11/1971 | Kobayashi | 317—235 |
| 3,736,193 | 5/1973 | Tucker et al. | 148—175 |
| 3,576,478 | 4/1971 | Watkins et al. | 317—235 |
| 3,617,826 | 11/1971 | Kobayashi | 317—235 |
| 3,621,346 | 11/1971 | Chang et al. | 317—235 |
| 3,671,338 | 6/1972 | Fujii | 148—175 |
| 3,692,574 | 9/1972 | Kobayashi | 117—212 |
| 3,702,790 | 11/1972 | Nakanuma et al. | 148—175 X |

L. DEWAYNE RUTLEDGE, Primary Examiner

W. G. SABA, Assistant Examiner

U.S. Cl. X.R.

29—576; 117—212, 215; 148—174, 188; 156—17; 317—235 R